March 10, 1942.  L. MICHAELIS ET AL  2,275,860
VOLT-AMPERE INDICATOR
Filed Dec. 6, 1939  2 Sheets-Sheet 1
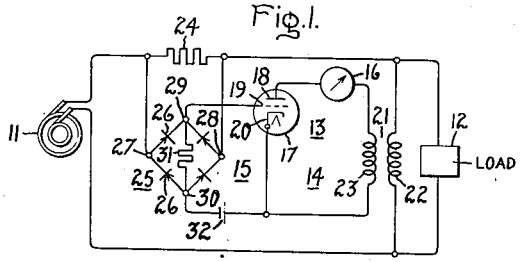
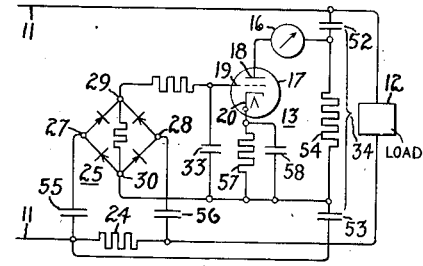
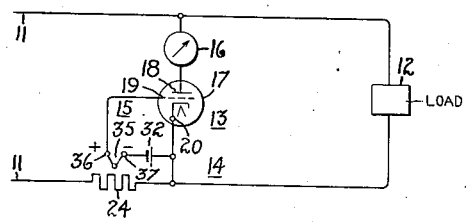
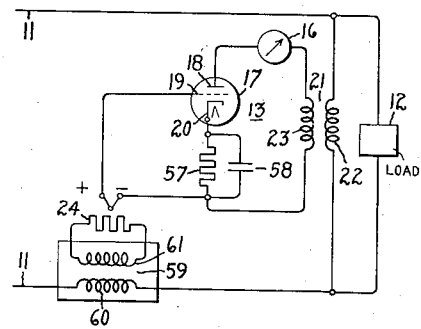
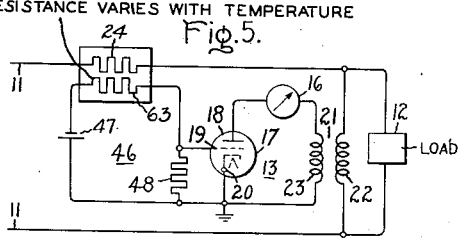
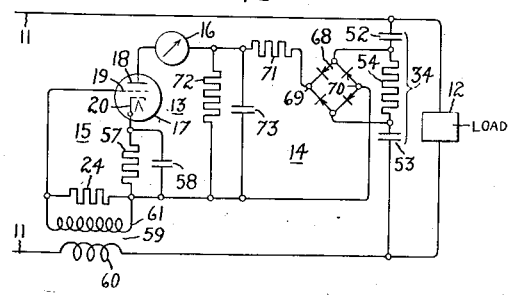
Inventors:
Lothar Michaelis,
David M. Davis,
by Harry E. Dunham
Their Attorney.

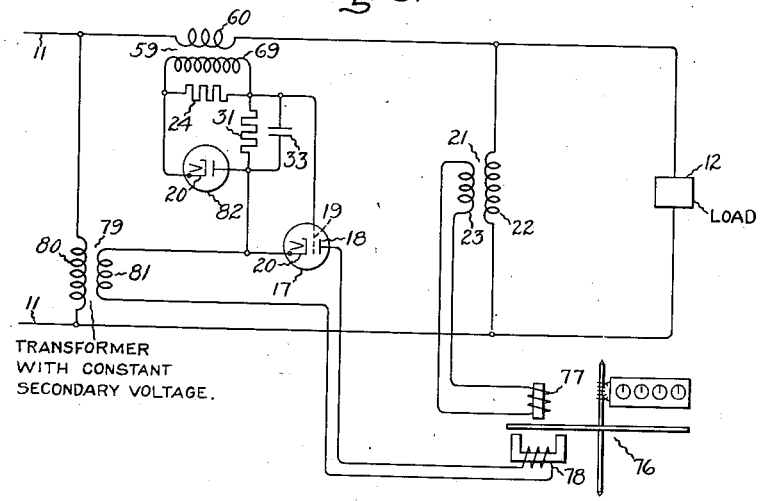

Patented Mar. 10, 1942

2,275,860

UNITED STATES PATENT OFFICE 2,275,860

VOLT-AMPERE INDICATOR

Lothar Michaelis, Washington, D. C., and David M. Davis, Schenectady, N. Y., assignors to General Electric Company, a corporation of New York Application December 6, 1939, Serial No. 307,838

9 Claims. (Cl. 171—34)

Our invention relates to volt-ampere responsive arrangements.

It is an object of our invention to provide improved methods and apparatus for measuring volt-amperes in alternating-current circuits, or for producing responses dependent upon volt-amperes without interfering with the circuits in which volt-amperes are to be measured and without loss of sensitivity or accuracy in either high-current or very-weak-current circuits.

Other and further objects and advantages will become apparent as the description proceeds.

In carrying out our invention in its preferred form we utilize an electronic discharge tube having anode and control electrode circuits, and we impress upon the anode circuit an alternating voltage proportional to the line voltage of the circuit in which volt-amperes are to be measured, and we impress upon the control-electrode circuit a unidirectional voltage proportional to the line current. A current-responsive device is connected in the anode circuit and is calibrated in terms of volt-amperes.

The invention will be understood more readily from the following detailed description when considered in connection with the accompanying drawings and those features of the invention which are believed to be novel and patentable will be pointed out in the claims appended hereto. In the drawings Figure 1 is a circuit diagram of one embodiment of our invention employing a full-wave dry rectifier for producing the unidirectional voltage applied in the control-electrode circuit. Figure 2 is a circuit diagram of a modified arrangement in which operating voltage is supplied to the anode circuit by capacity coupling. Figure 3 is a circuit diagram of another modified arrangement in which a thermoelectric element is employed for producing the unidirectional grid voltage; Fig. 4 is a modified arrangement similar to Fig. 3 in which the measuring circuit is isolated from the power lines and in which no external source of power is required; Fig. 5 is a circuit diagram of a modification embodying another arrangement for producing unidirectional voltages varying in response to the line current; Fig. 6 is a diagram of still another modification of the arrangement of Fig. 5; Fig. 7 is a modification in which rectified line voltage is impressed on the anode circuit and an alternating voltage proportional to line current is impressed on the control electrode circuit; and Fig. 8 is another modification in which an integrating current responsive device is used. Like reference characters are utilized throughout the drawings to designate like parts.

In the drawings we have illustrated apparatus for measuring or producing a response dependent upon the magnitude of the volt-amperes supplied by an alternating-current source 11 to a load 12, and in the following description we shall explain our method of measurement. We provide an electron discharge device 13 having a plate or anode circuit 14, and a control-electrode or grid circuit 15. In the anode circuit 14 we apply an alternating voltage varying in response to variations in the potential difference across the load 12, and in the grid circuit 15 we apply a unidirectional voltage varying in magnitude in response to variations in the magnitude of the line current supplied to the load 12. A current-responsive instrument 16, such as a milliammeter, a curve-drawing instrument, a telemeter transmitter, a contact-making ammeter, a relay for controlling other apparatus in response to variations of volt-amperes, an ampere-hour integrating meter or the like is connected in series with the anode circuit 14.

The electronic discharge device 13 is of the type in which variations in the discharge current may be produced by variations in the potential difference between the control electrode and the cathode. For example, a three-element vacuum tube of the type known by the trade as a "Pliotron" may be employed, comprising an evacuated envelope 17 containing an anode or plate 18, a control electrode or grid 19, and a cathode 20 which may either be indirectly heated or may take the form of an incandescent filament, as will be well understood by those skilled in the art.

For supplying a voltage to the anode circuit 14 an instrument or potential transformer 21 may be provided having a primary winding 22 connected across the load 12 and having a secondary winding 23 connected in series with the current-responsive device 16, the anode 18 and the cathode 20 of the tube 13. For producing indications of the magnitude of volt-amperes the instrument 16 is preferably of the direct-current type, such as a D'Arsonval instrument, in view of the sensitivity obtained in such instruments. However, when the maximum sensitivity of indication is not required, other types of instruments including alternating-current instruments may be employed.

For producing a voltage proportional to the current supplied to the load 12, a resistor 24 similar to those used as ammeter shunts, for example, is connected in series with the load 12, either directly or through a current transformer. For converting the alternating-current voltage drop across the resistor 24 to unidirectional voltage a rectifier 25, such as a full-wave copper-oxide rectifier, for example, is employed. The copper-oxide rectifier 25 consists of four dry rectifiers 26, arranged in the Graetz or bridge connection with two alternating-current input terminals 27 and 28 and two direct current output terminals 29 and 30. The output terminals 29 and 30 are connected in the grid circuit 15, that is, in series with the control electrode or grid 19 and the cathode 20. If desired, a resistor 31 may be connected between the terminals 29 and 30 for stabilizing the potential difference between these terminals by providing a continuous current path of constant resistance. To assist in maintaining constancy of the unidirectional voltage applied in the grid circuit 15, a condenser 33 (Fig. 2) may also be connected across the circuit. If substantial linearity of response is desired a source of negative biasing potential, such as a battery 32, is also connected in series with the grid circuit 15, with its connections such as tend to hold the grid 19 in its range of operation on the most nearly linear portion of its characteristic. To maintain absolute linearity as nearly as possible, the voltage of the biasing potential 32 should be sufficiently large to prevent the greatest voltage expected between the terminals 29 and 30 from driving the grid 19 to a curved portion of its operating characteristic. It will be understood, however, that if accurate amplification is not desired, and if absolute linearity is not a requisite, the voltage of the source 32 may be less, or the biasing potential 32 may be eliminated entirely.

When the load 12 is drawing current from the source 11 and the apparatus of Figure 1 is connected, a current will be caused to flow through the discharge tube 13 which represents a product of the average values of the current and voltage in the load 12, that is to say, the volt-amperes instead of the product of the instantaneous values or vector products, such as actual power or reactive component of volt-amperes. Electron discharge devices, such as the device 13, are affected both by the magnitude of the voltage applied to the anode and the voltage applied to the control electrode or grid. It is apparent that the voltage applied in the anode circuit is alternating and proportional to the voltage across the load 12 by virtue of the connection of the potential transformer 21. If an alternating voltage were applied in the control-electrode circuit proportional to current, the tube 13 with the instrument 16 would give an indication of the $r$-$m$-$s$ value of the instantaneous products of voltage and current or the power drawn by the load 12 rather than the volt-amperes. However, by rectifying the voltage representing current, the effect of variations in phase relationship is eliminated and a discharge current is caused to flow through the tube 13 proportional to the product of the average value of the variations in grid potential, and the average value of the positive half of the alternating anode voltage, which product is proportional to and thus represents the products of the average values of current and voltage drawn by the load 12. It will be understood, of course, that the instrument 16 may be so calibrated as to produce an indication in terms of the average values, maximum values or $r$-$m$-$s$ values, as desired.

In the arrangement of Figure 2 an operating voltage is applied to the anode circuit from the line by capacity coupling instead of by means of an electro-magnetic or inductive type transformer. For this purpose a bushing potential transformer or other suitable form of capacitative transformer 34 may be employed including a pair of condensers 52 and 53 and a resistor 54 connected in series across the power supply source 11 with the resistor 54 between the two condensers 52 and 53. The anode circuit of the tube 13 is connected across the resistor 54 so that the voltage supplied thereto fluctuates in accordance with the voltage across the power supply source 11, but the anode circuit is wholly insulated from the line. A pair of condensers 55 and 56 is also interposed between terminals 27 and 28, respectively, and the ends of the shunt 24 for the purpose of insulating the rectifier 25 from the line supplied by the source 11. If desired, the resistor 24 may be placed in the low side of the line as a further protection to the operator against any danger of contact with high voltage. Since all parts of the discharge tube circuit are insulated from the line the measurement circuits may be handled without danger to the operator.

In the arrangement of Fig. 2 the grid bias battery 32 is eliminated, and for furnishing negative grid bias to the grid 19, a resistor 57 has been connected in series with the tube 13 on the cathode side with the output terminal 30 of the rectifier 25 connected on the low side of the resistor 57 so that current flow through the resistor 57 produces a potential drop tending to maintain the grid 19 negative with respect to the cathode 20. In order to permit the passage of alternating current but take advantage of the rectifier action of the circuits for maintaining unidirectional bias on the grid 19, the condenser 58 is connected across the resistor 57.

In the circuit of Fig. 1 since the potential transformer primary winding 22 is connected directly across the load 12, the instrument is very accurately responsive to the magnitude of line voltage. However, it will be seen that the resistor 24 or current shunt actually carries not only the line current through the load 12, but also the exciting current of the potential transformer 21. Consequently, for very accurate work a slight correction may have to be made for this factor. The need for such a correction is eliminated in the circuit of Figure 2 in which the capacitative potential transformer 34 is connected directly across the input terminals from the supply circuit 11, and the resistor 24, therefore carries substantially only line current. However, in this case, the voltage applied to the transformer 34 is increased by the value of voltage drop in the resistor 24, and a slight correction will have to be made therefore in exceedingly accurate work.

It will be understood that only in circuits having sinusoidal current waves will the form factor or the factor expressing relationship between average current and root-mean-square current be constant. It will be apparent from the nature of the circuit of Figure 1 that it tends to cause measurements in terms of average or maximum values rather than $r$-$m$-$s$ values. If it is desired to use the measuring apparatus without change in calibration in circuits which may vary widely in form factor, there would preferably be applied in the grid circuit 15 a unidirectional voltage which follows variations in the $r$-$m$-$s$ value of current rather than in the average value of current. In such a case we may employ the arrangement of Figure 3 in which the resistor 24 takes the form of a thermocouple heater, and a thermoelectric generator or thermocouple 35 is provided which is in thermal contact with the resistor 24, so that its temperature varies in response to the temperature of the resistor 24, which in turn, varies in accordance with the mean square of the current therein. The thermocouple 35 is so connected that its positive terminal 36 is on the anode side of the grid circuit and its negative terminal 37 is on the cathode side. Consequently, the thermocouple 35 provides a positive voltage for the grid 19 dependent upon the line current flowing through the load 12. The anode circuit operates as described in connection with Fig. 1 and need not be described again in detail. It will be understood, of course, that as in Fig. 1 a negative bias may be provided in the grid circuit, if desired. Since the thermocouple 35 may be electrically insulated from the heater 24, the insulating and potential transformer 21 may be omitted without danger of interference between the anode and grid circuits.

Fig. 4 represents a modification in the arrangement of Fig. 3 in which the potential transformer 21 is employed, as in Fig. 1, for supplying anode voltage to the discharge tube circuit varying in accordance with line voltage, and in which a current transformer 59 having a primary winding 60, connected in series with the line, and a secondary winding 61, connected across the resistor 24, is interposed between the line circuit and the circuits of the measuring apparatus. A grid biasing resistor-condenser combination 57—58, described in connection with Fig. 2, is also employed. In this manner a circuit is provided in which the measuring apparatus is wholly insulated from the line and in which no auxiliary or external current sources are required.

In the arrangement of Fig. 5, a resistor 63 is connected in series in the grid circuit of the discharge tube 13; the resistor 24 is so arranged as to carry the current from the source 11 to the load 12 and to heat the resistor 63 in accordance with variations in line current.

The resistor 63 of Figure 5 is composed of a material having a relatively high temperature coefficient of resistance which may be either a negative or positive temperature coefficient as desired. The grid circuit 46 in the arrangement of Figure 5 includes also a source of unidirectional voltage such as a battery 47. The battery 47 is connected at its positive terminal to the cathode 20, and at its negative terminal is connected through the resistor 63 to the grid 19. It is, of course, understood that if a resistor 63 be used which has a negative temperature coefficient of resistance, the polarity of battery 47 should be reversed. Preferably a current stabilizing resistor 48 is connected in shunt with the portion of the grid circuit represented by the interelectrode space between the grid 19 and the cathode 20. However, the electron discharge current is sufficient to stabilize the current if a resistor 63 having a negative coefficient is used so that the battery 47 biases the grid 19 positive. The anode circuit in the arrangement of Figure 5 operates in the manner described in Figure 1. In response to variations in line current through the resistor 24, variations in temperature and resistance of the resistor 63 will be produced which will cause variations in direct current supplied by the source 47 flowing through the resistor 48, which, in turn, will cause variations in the positive voltage applied to the grid 19. The grid voltage is accordingly caused to vary and depends upon variations in line current independently of variations in the phase relationship of the line current so that the instrument 16, as in the previous cases, may be calibrated in terms of volt-amperes supplied to the load 12.

Although in the arrangement of Figure 5 we have shown a separate voltage source 47 serving as an auxiliary energizing source for the grid circuit, it will be understood that our invention is not limited to this precise arrangement, and that the energizing potential may be obtained in any desired manner. For example, the natural rectifying action of the discharge tube 13 may be employed for obtaining a unidirectional voltage in the grid circuit, and a current responsive resistor may be employed for varying the grid potential in accordance with variations in line current or voltage. In the arrangement of Figure 6 a temperature responsive resistor 63 is placed in proximity to the ammeter shunt 24 so as to be varied in temperature in accordance with variations in line current. A grid bias is provided by the resistor 57 shunted by the condenser 58 and connected in series with the tube 13 on the cathode side. An additional resistor 64 which may be made variable for purposes of adjustment of sensitivity is connected between the grid 19 and a tap 65 connected to an intermediate portion of the resistor 57 and slidable therealong to permit adjustment in the degree of bias provided. To insure passage of alternating current components an additional condenser 66 is preferably also provided across the upper portion of the resistor 57 between the cathode 20 and the tap 65.

In the arrangement illustrated the resistor 63 is assumed to have a positive temperature coefficient of resistance, that is to say, the resistance increases as the temperature increases as the current flow through the resistor 24 increases. With no current flow through resistor 24, the resistance of the resistor 63 is relatively low so that it tends to maintain the grid 19 at the potential of the lower end of the grid 57, thus maintaining it highly negative with respect to the cathode 20. On the other hand, as the current in the line increases increasing the resistance of the resistor 63, its effect diminishes and the potential of the grid 19 approaches that of the tap 65 causing the potential of the grid 19 to rise and cause increase in anode current in accordance with the well-known characteristics of discharge tubes. The actual potential of the grid 19 will, of course, vary in accordance with variations in line current so that the arrangement of Figure 6 serves, similarly to the other arrangements, to produce a current output varying in accordance with line current, as well as in accordance with line voltage so as to give an indication of volt-amperes.

If the resistor 63 is composed of material having a negative temperature coefficient of resistance, that is to say, there is a decrease in resistance with an increase in temperature, the right-hand end 67 of the resistor 63 would be connected to the cathode 20 instead of to the lower end of the resistor 57. In this manner the grid potential would be raised as the resistance of the resistor 63 goes down with an increase in line current, and the resistor 57 would maintain the grid 19 at relatively low potential when the resistor 63 is cool and has a high resistance due to low line current. The circuit of Figure 6 may, of course, be used either with an inductive type potential transformer energizing the anode circuit or with a capacitative type of transformer 34, as shown.

Although in the arrangements previously described the voltage proportional to current has been represented as applied in the control grid circuit of the discharge tube 13, and the voltage proportional to line voltage has been represented as applied in the anode circuit 14 of the discharge tube 13, it will be understood that our invention is not limited to this specific arrangement and that the voltages representing line current and line voltage may be interchanged. Likewise, our invention is not limited to rectifying the voltage applied to the control grid, and our invention embraces rectifying the voltage applied in the anode circuit 14 instead. In the arrangement illustrated in Figure 7 the voltage drop in the resistor 24 representing line current is applied in the control electrode circuit 15, and a rectified voltage proportional to line voltage is applied in the anode circuit 14. The arrangement is shown as utilizing the capacitative potential transformer 34, although an inductive transformer might also be employed. A rectifier 68 is connected across the output terminals of the capacitative potential transformer 34, that is across the resistor 54, and the output terminals 69 and 70 of the rectifier 68 are connected in the anode circuit 14 on the side of the anode 18 and the cathode 20, respectively. Preferably a filter circuit is employed comprising resistors 71 and 72 connected in series across the output terminals 69 and 70 of the rectifier 68 and a condenser 73 connected across the resistor 72. The tube 13 is preferably so biased as to operate on the non-linear portion of its characteristic curve and act as a bend detector. It will be observed that as the voltage across the line fluctuates the rectified voltage applied in the anode circuit 14 will vary. Accordingly, if the tube is operated as a bend detector, as the line current varies, the breadth of potential swings of the control electrode 19 will vary, consequently varying the points on the characteristic curve at which the tube 13 operates so as to vary its average discharge current. The anode current of course also fluctuates in response to variations in anode voltage so that the instrument 16 carries a current dependent upon the product of line current and line voltage.

In Fig. 8 we have illustrated an arrangement for registering an integrated value of voltampere hours. The current-responsive device may take the form of an induction disk meter 76 of the type used for watt-hour meters or ampere-hour meters. In the arrangement illustrated the induction disk meter 76 is provided with a potential winding 77 and a current winding 78 and one of these windings is connected in the plate circuit of the tube 17, the other winding being energized from the power source 11. In the specific form illustrated the potential winding 77 is energized by the transformer 21 which is connected across the source 11 and the current winding 78 is connected in series with the plate circuit of the tube 17. A second transformer 79 is employed which has a primary winding 80 connected across the current source 11 and a secondary winding 81 energizing the plate circuit of the tube 17 in series with the winding 78. In order to eliminate the voltage-squared factor from the registration of the meter 76, one or the other of the transformers 21 or 79 is of the constant-secondary-voltage type such as a saturable core transformer, for example. If the transformer 21 is of the constant secondary voltage type, voltage fluctuations have no effect on the potential circuit of the meter and the registration depends only upon the integrated value of the plate current of the tube 17 which, as already explained in connection with the previous figures, represents the volt-amperes of the load 12. On the other hand, if wide voltage fluctuations are anticipated which might make it difficult to keep the operation of the apparatus within the linear portion of the characteristic curve of the tube 17, the transformer 79 may be the one which is of the constant-voltage-secondary type, and the transformer 21 may be an ordinary potential transformer. In this case the meter 76 integrates the product of the voltage applied to the potential winding 76 and the current flowing in the current winding 78 in the usual manner. However, the current flowing in the winding 78 is in phase with the voltage applied to the potential winding 77 regardless of the power factor of the load 12 and is proportional to the current supplied to the load 12 so that the registration of the meter 76 is proportional to the volt-ampere hours of the circuit supplying the load 12.

Where current transformers are employed we prefer to utilize a full wave rectifier on the secondary side of the transformer.

However, if desired, the dry type rectifier may be replaced with an electronic valve type rectifier 82, as illustrated in Fig. 8. In this case the resistor 24 provides the load for the secondary winding of the current transformers to avoid overvoltage. The rectifier 82 rectifies a voltage across the secondary winding 69 causing a unidirectional current to flow through the resistor 31 which is in proportion to the line current, and the condenser 33 together with the resistor 31 serves to smooth out the fluctuations and cause a substantially continuous positive potential to be applied to the control electrode 19 depending in magnitude upon the magnitude of the load current.

We have shown herein and particularly described certain embodiments of our invention and certain procedures embraced therein for the purpose of explaining its principle and showing its application but it will be obvious to those skilled in the art that many modifications and variations are possible and we aim, therefore, to cover all such modifications and variations as fall within the scope of our invention which is defined in the appended claims.

What we claim as new and desire to secure by Letters Patent of the United States, is:

1. Apparatus responsive to volt-amperes in an alternating-current electrical circuit having a current referred to as line current and a voltage referred to as line voltage, said apparatus comprising an electron discharge device having an anode, a cathode and a control electrode, and being of the type responsive to variations in anode voltage, and also to variations in control electrode voltage, a current-responsive instrument connected in a circuit including the anode and the cathode referred to as the anode circuit, means for applying a voltage in the anode circuit proportional to line voltage, a resistor connected to carry line current, a full wave rectifier having input terminals connected across said resistor and having output terminals, said output terminals being connected in a control-electrode circuit including said control electrode and said cathode, the connections being such that the positive output terminal of the rectifier is connected on the side of the control-electrode circuit toward the control electrode, and the negative output terminal of the rectifier is connected on the side of the control-electrode circuit toward the cathode, whereby a voltage is impressed in the control-electrode circuit varying in response to variations in line current without regard to phase thereof, and a discharge current is caused to flow through said discharge device and said current responsive instrument varying in dependence upon variations in volt-amperes.

2. Apparatus responsive to volt-amperes in an alternating-current electrical circuit having a current referred to as line current and a voltage referred to as line voltage, said apparatus comprising an electron discharge device having an anode, a cathode and a control electrode, and being of the type responsive to variations in anode voltage, and also to variations in control electrode voltage, a current-responsive device connected in a circuit including the anode and the cathode referred to as the anode circuit, means for impressing in the anode circuit a voltage varying in response to variations in one of the two quantities, line voltage and line current, rectifying means, means for applying to said rectifying means voltage varying in response to variations in the other of the two quantities, line voltage and line current, whereby a rectified voltage is produced, means for applying the rectified voltage in a control-electrode circuit including the control electrode and the cathode of said discharge device, whereby the control-electrode potential varies in response to variations of said other quantity without regard to phase relationship between line voltage and line current, and a discharge current is produced in said discharge device and said current-responsive device varying in response to variations in the volt-amperes.

3. Apparatus responsive to volt-amperes in an alternating-current electrical circuit having a current referred to as line current and a voltage referred to as line voltage, said apparatus comprising an electron discharge device having an anode, a cathode and a control electrode, and being of the type responsive to variations in anode voltage, and also to variations in control electrode voltage, a current-responsive device connected in a circuit including the anode and the cathode referred to as the anode circuit, means for impressing in said anode circuit a voltage varying in response to variations in one of the two quantities, line voltage and line current, and means for impressing in a circuit including the control electrode and the cathode a unidirectional voltage varying in response to variations in the other of the two quantities, line voltage and line current.

4. Apparatus responsive to volt-amperes in an alternating-current electrical circuit having a current referred to as line current and a voltage referred to as line voltage, said apparatus comprising an electron discharge device having an anode, a cathode and a control electrode, a current-responsive device connected in a circuit including the anode and the cathode referred to as the anode circuit, means for impressing therein a voltage proportional to one of the two quantities, line voltage and line current, a thermocouple, means for heating the thermocouple in response to variations in the other of the two quantities, line voltage and line current, said thermocouple having a positive output terminal and a negative output terminal connected in a control-electrode circuit including the control electrode and the cathode of said discharge tube.

5. Apparatus responsive to volt-amperes in an alternating-current electrical circuit having a current referred to as line current and a voltage referred to as line voltage, said apparatus comprising an electron discharge device having an anode, a cathode and a control electrode, a current-responsive device connected in a circuit including the anode and the cathode referred to as the anode circuit, means for impressing therein a voltage proportional to one of the two quantities, line voltage and line current, a resistor having a resistance varying in response to variations in temperature, means for varying the temperature of said resistor in response to variations in the other of the two quantities, line voltage and line current, and an auxiliary source of unidirectional voltage connected in series with said resistor in a control-electrode circuit including the control electrode and the cathode of said discharge tube, whereby a unidirectional voltage is applied to said control electrode varying in response to said other of the two quantities without regard to variations in phase relationship between line voltage and line current.

6. Apparatus responsive to volt-amperes in an alternating-current electrical circuit having a current referred to as line current and a voltage referred to as line voltage, said apparatus comprising an electron discharge device having an anode, a cathode and a control electrode, a current-responsive device connected in a circuit including the anode and the cathode referred to as the anode circuit, means for impressing therein a voltage proportional to one of the two quantities, line voltage and line current, a resistor having a resistance varying in response to variations in temperature connected between said control electrode and said cathode, means for varying the temperature of said resistor in response to variations in the other of said two quantities, line voltage and line current, said discharge tube having connections to insure a supply of current to said temperature responsive resistor, whereby the voltage drop in said resistor varies in response to variations in temperature and varies in response to said other of the two quantities without regard to variations in phase relationship between line voltage and line current.

7. Apparatus responsive to volt-amperes in a line carrying electric power, said apparatus comprising a current-responsive device, an electron discharge device having an anode, a cathode, and a control electrode, and being of the type responsive to variations in anode voltage, and also to variations in control electrode voltage, said anode and cathode being connected in a first circuit including said current-responsive device, and said control electrode and cathode being connected in a second circuit, means for energizing said first circuit by an alternating voltage proportional to the voltage on said line, and means for energizing said second circuit by a unidirectional voltage proportional to the current in said line.

8. Apparatus responsive to volt-amperes in a line carrying electric power, said apparatus comprising a current-responsive device, an electron discharge device having an anode, a cathode and a control electrode, and being of the type responsive to variations in anode voltage, and also to variations in control electrode voltage, said anode and cathode being connected in a circuit including said current-responsive device, and said control electrode and cathode being connected in a second circuit, means for energizing one of said circuits by an alternating voltage proportional to the voltage on said line, and means for energizing the other of said circuits by a unidirectional voltage proportional to the current in said line.

9. Apparatus responsive to volt-amperes in a line carrying alternating current electric power, said apparatus comprising a current-responsive device, an electron discharge device having an anode, a cathode and a control electrode, and being of the type responsive to variations in anode voltage, and also to variations in control electrode voltage, said anode and cathode being connected in a circuit including said current-responsive device, and said control electrode and cathode being connected in a second circuit, means for deriving an alternating voltage proportional to the voltage of said line, means for deriving a second alternating voltage proportional to the current in said line, means for producing a continuous voltage from one of said alternating voltages, means for constantly energizing one of said circuits by said continuous voltage, and means for energizing the other of said circuits by the other of said alternating voltages.

LOTHAR MICHAELIS.
DAVID M. DAVIS.